(12) United States Patent
Kelsey

(10) Patent No.: US 8,656,601 B2
(45) Date of Patent: Feb. 25, 2014

(54) MEASURING AND CUTTING APPARATUS

(76) Inventor: Michael P. Kelsey, Brighton, MA (US)

( * ) Notice: Subject to any disclaimer, the term of this patent is extended or adjusted under 35 U.S.C. 154(b) by 1019 days.

(21) Appl. No.: 12/264,334

(22) Filed: Nov. 4, 2008

(65) Prior Publication Data

US 2010/0107842 A1 May 6, 2010

(51) Int. Cl.
B43L 13/02 (2006.01)
(52) U.S. Cl.
USPC .................................................. 33/42; 33/32.1
(58) Field of Classification Search
USPC .................... 33/32.1, 32.2, 32.3, 42
See application file for complete search history.

(56) References Cited

U.S. PATENT DOCUMENTS

| | | | |
|---|---|---|---|
| 4,481,713 A * | 11/1984 | Howell | 33/39.2 |
| 5,157,843 A * | 10/1992 | Barcewski | 33/392 |
| 5,979,238 A | 11/1999 | Boege | |
| 6,101,734 A | 8/2000 | Ten Caat | |
| 6,553,684 B2 | 4/2003 | Jenkins | |
| 6,705,018 B2 | 3/2004 | Guhse | |
| 6,868,620 B2 | 3/2005 | Sanoner | |
| 6,915,587 B1 | 7/2005 | Scillia | |
| 7,103,988 B2 | 9/2006 | Sanoner | |
| 7,260,898 B2 | 8/2007 | Snelson | |
| 7,260,899 B2 | 8/2007 | Jones | |
| 7,263,784 B1 | 9/2007 | Lee | |
| 7,698,823 B1 * | 4/2010 | Iadarola | 30/537 |
| 2005/0028383 A1 * | 2/2005 | Zerlin | 30/277.4 |
| 2005/0132585 A1 * | 6/2005 | Weber et al. | 30/537 |
| 2006/0174489 A1 * | 8/2006 | Kohler et al. | 30/143 |
| 2008/0072430 A1 * | 3/2008 | Cafaro et al. | 30/45 |

* cited by examiner

Primary Examiner — G. Bradley Bennett
(74) Attorney, Agent, or Firm — Lambert & Associates; Gary E. Lambert; David J. Connaughton, Jr.

(57) ABSTRACT

A measuring and cutting device, ergonomically designed, comprising a user interface with a plurality of user depressible option selection members and a user readable display. A cutting device is tethered to the apparatus base by a continuous fiberous member, wherein the distance that the cutting device has moved away from the apparatus base is continuously measured. The device provides several modes in which users may make their measurements as well as various alert options to inform users when a certain distance has been measured. The various embodiments of this invention envision several cutting apparatuses and power sources.

19 Claims, 7 Drawing Sheets

MEASURING AND CUTTING APPARATUS

FIELD OF THE INVENTION

The present invention relates generally to cutting and distance measuring devices, and in particular it relates to cutting and distance measuring devices for use in construction environments.

BACKGROUND OF INVENTION

Carpenters, home-improvement enthusiasts and others that perform work in the construction and building arena traditionally use measuring tape to determine the lengths of boards, sheet roc, sheet metals or any other type of material that needs to be measured and then cut to a needed size. Unfortunately, the use of a standard measuring tape requires the user to: 1. hold the tape with one or both hands, 2. carefully visually inspect the length found on the measuring tape and 3. adjust the length on the tape until the desired length is found. After finding the desired length on the measuring tape, the user then typically needs to mark the surface of the material where the desired length is located. This second, marking step, normally requires that the user free one hand to grab the right type of marking tool while holding the measuring tape in the other hand, or getting a second person to assist the user. Next, once the desired length has been found and marked on the material, a cutting tool must be grabbed by the user and finally the desired cut in the material can be made.

This process is often substantially repeated several times for one simple piece of material to be cut. This leads to a far more cumbersome and time consuming process then is necessary including the need to switch between tools to simply measure and cut at a desired length.

Some innovations in the prior art have attempted to improve on this inefficient process but introducing measuring tape devices that possess the ability to mark where cuts are to be made. This still, however, requires that a user must then grab and utilize a separate cutting tool. Further, all such attempts maintain the standard measuring tape design, which is relatively bulky, ergonomically unfriendly to the human hand and wasteful of materials.

What is needed is measuring and cutting device that can easily and accurately inform the user the distance that is currently being measured allowing users to have a single tool that allows them to make their cuts and measure their lengths, while being ergonomically friendly. The present invention provides a solution to these shortcomings.

SUMMARY OF THE INVENTION

The instant invention, as illustrated herein, is clearly not anticipated, rendered obvious, or even present in any of the prior art mechanisms, either alone or in any combination thereof. An ergonomic measuring and cutting device that frees users from switching between a measuring tool, marking tool and cutting tool when seeking to make cuts in a material. Thus, the several embodiments of the instant invention are illustrated herein.

Therefore, it is an object of the present invention to overcome the previously mentioned shortcomings found in the prior art with an improved measuring and cutting apparatus.

Another object of the present invention is to provide an improved measuring and cutting apparatus that displays the distance from the apparatus base to the cutting instrument.

Another object of the present invention is to provide an improved measuring and cutting apparatus that electronically measures the distance from the apparatus base to the cutting instrument.

Another object of the present invention is to provide an improved measuring and cutting apparatus that digitally measures the distance from the apparatus base to the cutting instrument.

Another object of the present invention is to provide an improved measuring and cutting apparatus that allows a user to set a predetermined distance to be measured before uncoiling its measuring member.

Another object of the present invention is to provide an improved measuring and cutting apparatus that alerts a user when a user predetermined distance to be measured has been reached.

Another object of the present invention is to provide an improved measuring and cutting apparatus that alerts a user with a sound when a predetermined distance to be measured has been reached.

Another object of the present invention is to provide an improved measuring and cutting apparatus that alerts a user with a flashing light when a predetermined distance to be measured has been reached.

Another object of the present invention is to provide an improved measuring and cutting apparatus that alerts the user that a predetermined distance to be measured has been reached with flashing lights and sounds.

Another object of the present invention is to provide an improved measuring and cutting apparatus that alerts the user that a predetermined distance to be measured has been reached with flashing lights or sounds.

Another object of the present invention is to provide an improved measuring and cutting apparatus that alerts the user whenever a predetermined distance interval has been measured.

Another object of the present invention is to provide an improved measuring and cutting apparatus that alerts with sounds the user whenever a predetermined distance interval has been measured.

Another object of the present invention is to provide an improved measuring and cutting apparatus that alerts the user with flashing lights whenever a predetermined distance interval has been measured.

Another object of the present invention is to provide an improved measuring and cutting apparatus that alerts the user with sounds and flashing lights whenever a predetermined distance interval has been measured.

Another object of the present invention is to provide an improved measuring and cutting apparatus that alerts the user with sounds or flashing lights whenever a predetermined distance interval has been measured.

Another object of the present invention is to provide an improved measuring and cutting apparatus that comprises a stationary cutting apparatus (i.e. a stationary cutting blade).

Another object of the present invention is to provide an improved measuring and cutting apparatus that comprises a rotating cutting apparatus (i.e. a circular cutting blade that rotates about an axis).

Another object of the present invention is to provide an improved measuring and cutting apparatus that tethers the cutting apparatus to the apparatus base by a wire.

Another object of the present invention is to provide an improved measuring and cutting apparatus that tethers the cutting apparatus to the apparatus base by a string.

Another object of the present invention is to provide an improved measuring and cutting apparatus that tethers the cutting apparatus to the apparatus by a long, thin and flexible material.

Another object of the present invention is to provide an improved measuring and cutting apparatus that removes the need for a user to personally calculate the difference of the top portion of a material from the bottom portion of the material when measuring a distance.

Another object of the present invention is to provide an improved measuring and cutting apparatus that reduces waste cutting material by reducing human error in measuring.

Another object of the present invention is to provide an improved measuring and cutting apparatus that reduces costs by saving on wasted material by reducing human error in measuring.

Another object of the present invention is to provide an improved measuring and cutting apparatus that reduces the need for users to hyperextend their arms by allowing the device to perform mathematical operations.

Another object of the present invention is to provide an improved measuring and cutting apparatus that can be used on a wide variety of lengths and widths.

Another object of the present invention is to provide an improved measuring and cutting apparatus that displays a plurality of modes the apparatus is operating under.

Another object of the present invention is to provide an improved measuring and cutting apparatus that is electrically powered.

Another object of the present invention is to provide an improved measuring and cutting apparatus that is electrically by receiving electrical current though batteries.

Another object of the present invention is to provide an improved measuring and cutting apparatus that is electrically powered by directly receiving electrical current through an electrical cord.

Another object of the present invention is to provide an improved measuring and cutting apparatus that is electrically powered by receiving electrical current through kinetic energy.

Another object of the present invention is to provide an improved measuring and cutting apparatus that functions without electrical power.

Another object of the present invention is to provide an improved measuring and cutting apparatus that functions by manual power.

Another object of the present invention is to provide an improved measuring and cutting apparatus that is ergonomically designed to be comfortably grasped by a human hand.

These together with other objects of the invention, along with various features of novelty which characterize the invention, are pointed out with particularity in the claims, Detailed Description of the Embodiments Sections and drawings of this application, with all said sections adding to this disclosure.

DETAILED DESCRIPTION OF THE DISCLOSED EMBODIMENTS

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention, such as measuring and cutting devices as substantially described herein, that have various sizes, dimensions and are comprised of various materials and those designed for left-handed and right-handed users (wherein left-handed and right-handed versions of the invention are substantially mirror images of each other).

Figure 1:
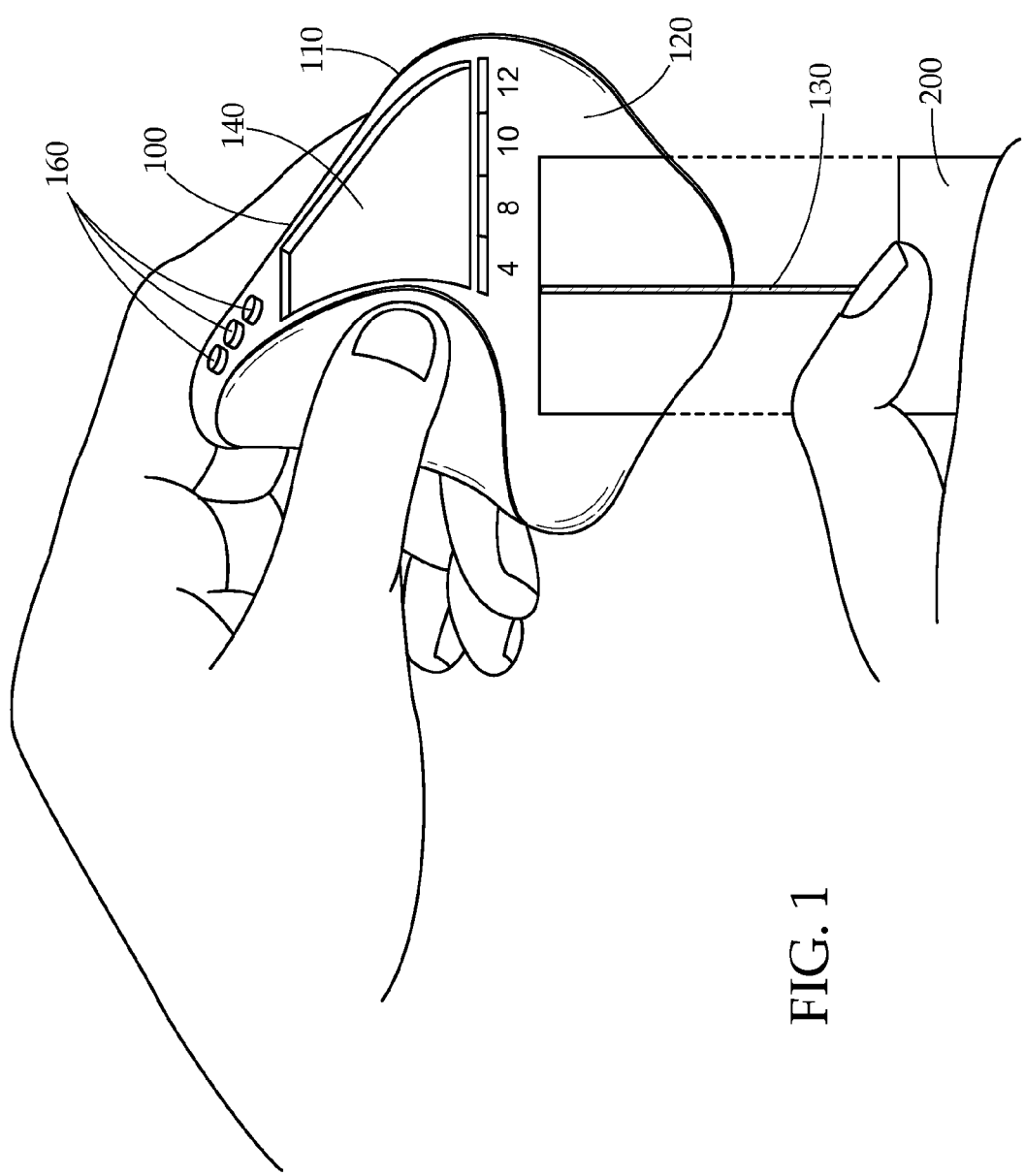
FIG. 1 illustrates a front view of the improved measuring and cutting apparatus, wherein the apparatus is being held by a human hand and the cutting assembly is extended from the top unit assembly.

Illustrated in FIG. 1 is the measuring and cutting device 100 and several components comprising the base unit assembly 120 and cutting unit assembly 200. Comprising the base unit assembly 120 are the following: a digital display member 140, a plurality of mode and option selection members 160. In addition, the base unit assembly 120 comprises an outer housing member 110, wherein in this embodiment of the instant invention said outer housing member 110 comprises a substantially ergonomically shaped designed (to conform to being held by a human hand). Further illustrated in FIG. 1 is a tethering member 130, comprised of a long thin flexible material such as nylon or other similar material used in making string, rope or cords, extending from within said base unit assembly 120 to said cutting assembly 200, and designed for tethering said base unit assembly 120 and said cutting assembly 200 together.

The digital display member 140, also illustrated in FIG. 1, provides an electronically displayed and human readable information regarding options currently selected through inputs from said option selection members 160 and a plurality of material dimension selection members 150. The option selection members 160 allow users to enter information regarding the dimensions of the material, which direction the user intends to cut from, the sound and visual alert settings to display, the increment sizes when audio and visual alerts (substantially displayed on said digital display member 140) can be made and other relevant cutting, measuring and option selection information for the current cutting and measuring task. The user alert information is offered via flashing lights, continuous illuminated graphical, textual and/or combinations of graphical and textual depictions to inform the user when a measuring or cutting event has taken place, (such as when a predetermined distance interval has been measured). Additionally, the option selection members allow users to select a unit of measurement (for instance British standard units or Metric units) and to even convert between said units of measurement.

Also optionally displayed on the digital display assembly are the dimensions of the material to be measured and/or cut, wherein the material's dimensions are entered, in via said plurality of material dimension selection members 150. In one embodiment of this invention, as illustrated in FIG. 1, each member of said displayed material dimension selection members 150 illustrates one common dimension for a material allowing the user to enter in two (or more) dimensions of the material with just two dimensions (or more). Thus, if a material to be measured and/or cut possesses length and width dimensions of four measure units by eight measure units a user would first select the four measure unit selection member and then select the eight unit selection member. To continue with the selection of an additional dimension a user would select the selection member that corresponds to the scale of said additional dimension (using the appropriate units of measure).

Figure 2:
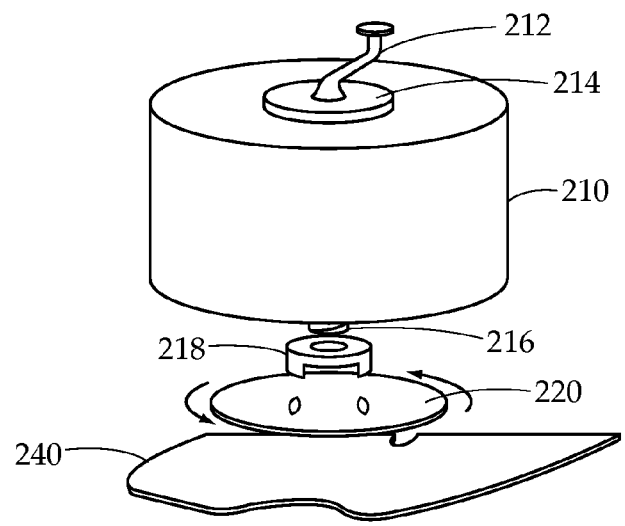
FIG. 2 illustrates an exploded view of the internal components used in the powered cutting assembly embodiment of the instant invention.

FIGS. 2-5A illustrate an embodiment of the instant invention wherein the cutting assembly 200 employs a powered cutting blade 220. In such embodiments the tethering member 130 also serves as a power transfer means to the blade motor assembly 210. In other embodiments of the instant invention the cutting assembly 200 employs a non-powered cutting blade 220 and the tethering member 130 need not serve as a power transfer means FIG. 2 illustrates an exploded view of the blade motor assembly 210, wherein said blade motor assembly 210 comprises an internal power transfer member 212, such as an electrical wire, wherein said internal wire transfer member is connected to the tethering member 130 (wherein in this embodiment said tethering member 130 does serve as a power transfer means). A power transfer member securing member 214 is securely attached to said blade motor assembly 210 and further securely holds said power transfer member 212 to said blade motor assembly 210. Also illustrated in FIG. 2 is a threaded rotating member 216 protruding outwardly from within said blade motor assembly 210, wherein said threaded rotating member 216 transfers a rotating motion from said blade motor assembly 210 to the blade member 220. Aiding to secure said blade member 220 and said threaded rotating member 216 is the internally threaded and externally grooved blade brace member 218, such as a threaded washer, that attaches to said threaded rotating member 216 and provides separation between said cutting blade member 220 and said threaded rotating member 216. Also illustrated in FIG. 2 is an isometric top-down view of a cutting assembly bottom housing member 240.

Figure 3:
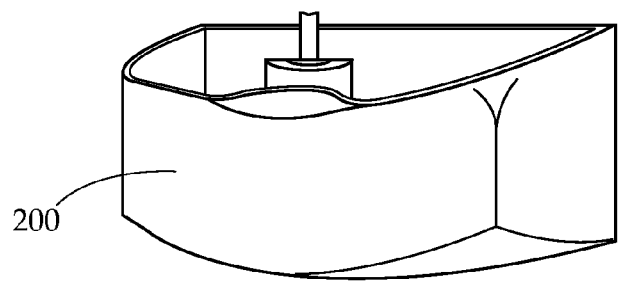
FIG. 3 illustrates and internal and external front views of the cutting assembly.

FIG. 3 illustrates an external and internal view of the cutting assembly 200 where internally visible is the blade stabilizer assembly 230 (see FIG. 3A), comprising a stabilizer roller member 233 and a stabilizer assembly attachment member 235, wherein the blade stabilizer assembly 230 is mounted on the rear wall of said cutting assembly 200. In alternate embodiments of the instant invention the cutting assembly is not power driven and therefore does not comprise a blade stabilizer assembly 230 as illustrated in FIGS. 3 and 3A.

Figure 3A:
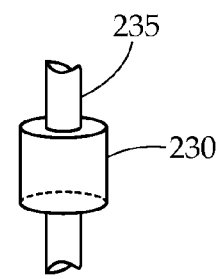
FIG. 3A illustrates the stabilizer assembly.
Figure 4:
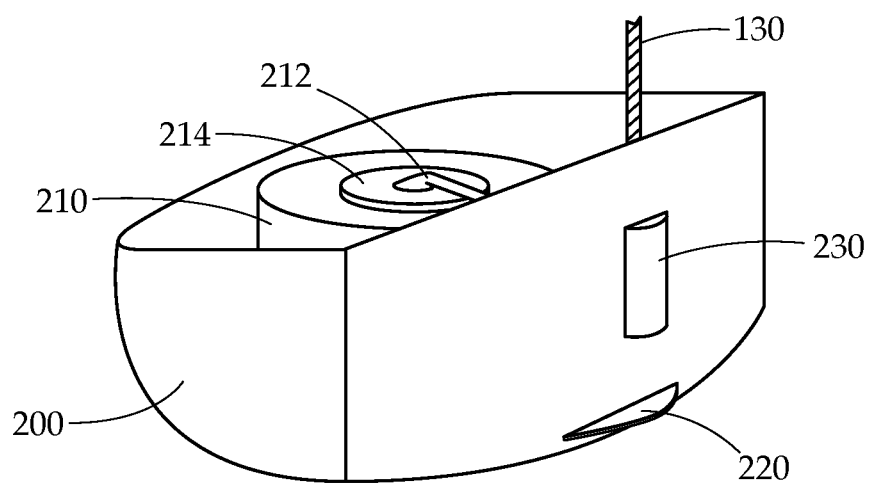
FIG. 4 illustrates internal and external isometric rear views of the cutting assembly.
Figure 4A:
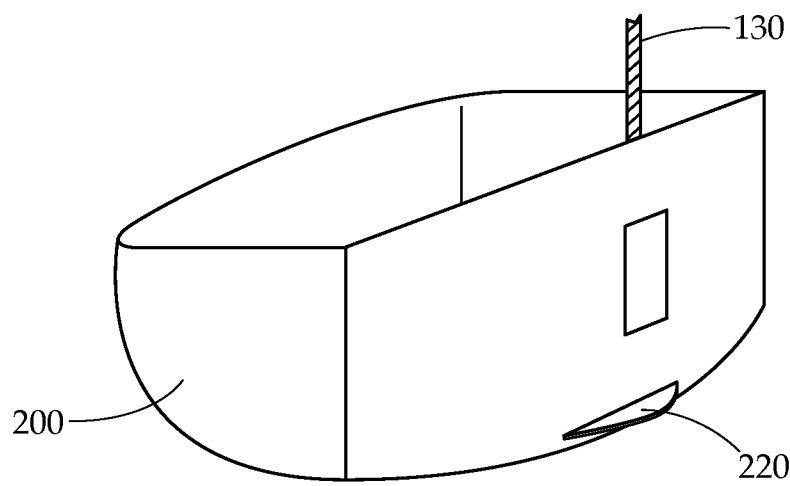

FIG. 4 illustrates an external and internal view of the cutting assembly 200 and the components illustrated in FIG. 2, 3 and 3A as they are disposed when assembled within said cutting assembly 200. Visible as protruding extending outward from the cutting assembly outer housing are the stabilizer roller member 230 and the blade member 220. Internally visible is the motor assembly 210, wherein the power transfer member securing member 214 is secured to said motor assembly 210 and, wherein said power transfer member 212 is also secured to said motor assembly 210 by said power transfer member securing member 214.

Figure 5:
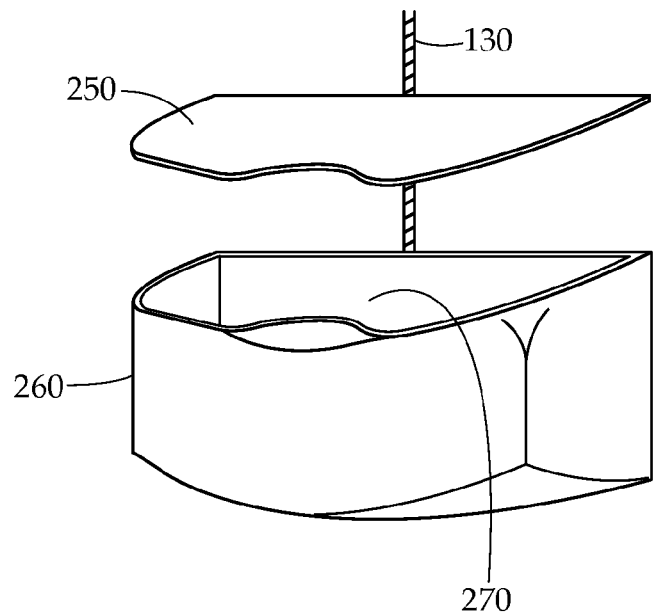
FIG. 5 illustrates an open external view of the cutting assembly with an empty central chamber.

FIG. 5 illustrates an external front view of the cutting assembly 200, wherein the central chamber in the powered cutting assembly embodiment of the instant invention 270 houses the internal motor assembly 210, the blade stabilizer assembly 230, cutting blade member 220 and all of the component parts of these assemblies. Further, a top housing member 250 is illustrated above the remaining cutting assembly housing 260, wherein the top housing member seals the top of said cutting assembly housing 260. Note that FIG. 5 also illustrates an external front view of an unpowered or manually operated cutting assembly 200.

Figure 5A:
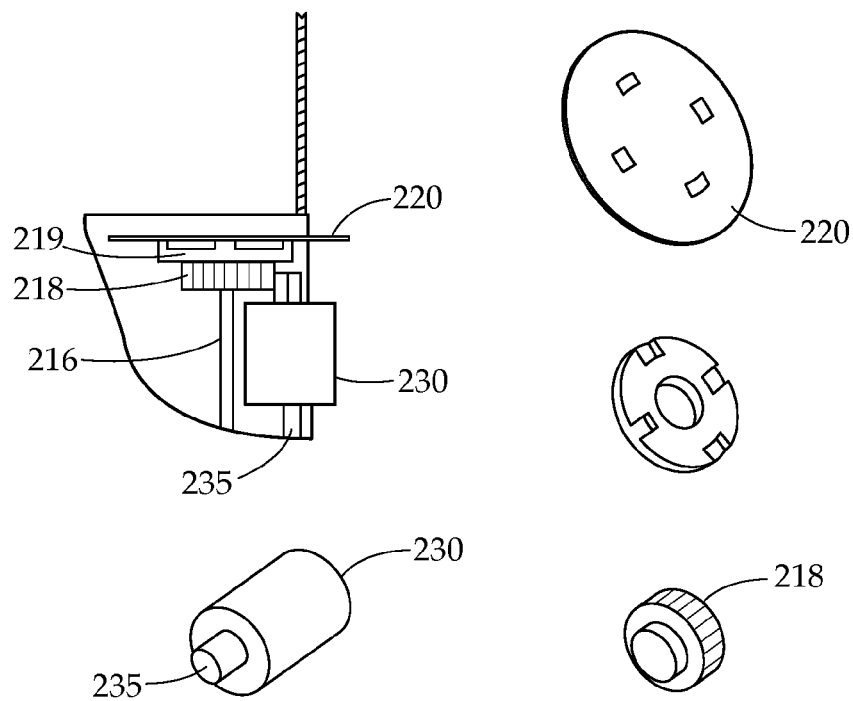
FIG. 5A illustrates an internal view of the cutting assembly with individual views of some of the internal components.

FIG. 5A illustrates an internal side view of the powered embodiment of the cutting assembly 200, wherein the threaded rotating member 216 is shown entering into the internally threaded and externally grooved blade brace member 218, through an additional spacer member 219 and attaches to said cutting blade member 220. Also illustrated is the location where the stabilizer assembly attachment member 235 connectively rests next to said internally threaded and externally grooved blade brace member 218. Further illustrated is the location where the stabilizer roller member passes through the external housing of said cutting assembly 200, allowing part of said stabilizer roller member to protrude outwardly from the external housing of said cutting assembly 200. Note that FIG. 5A illustrates an embodiment of the instant invention wherein the cutting blade member 220 rests above the blade stabilizer assembly 230. However, in other embodiments the cutter blade member 220 may rest below the blade stabilizer assembly 230 (as illustrated in FIG. 4) by inverting the internally illustrated components in FIG. 5A.

Figure 6:
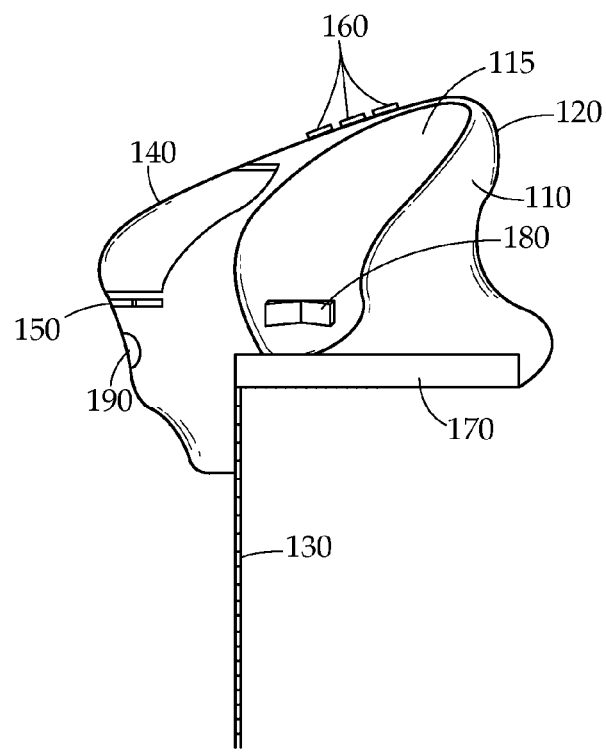
FIG. 6 illustrates an external side view of the upper unit apparatus.
Figure 6A:
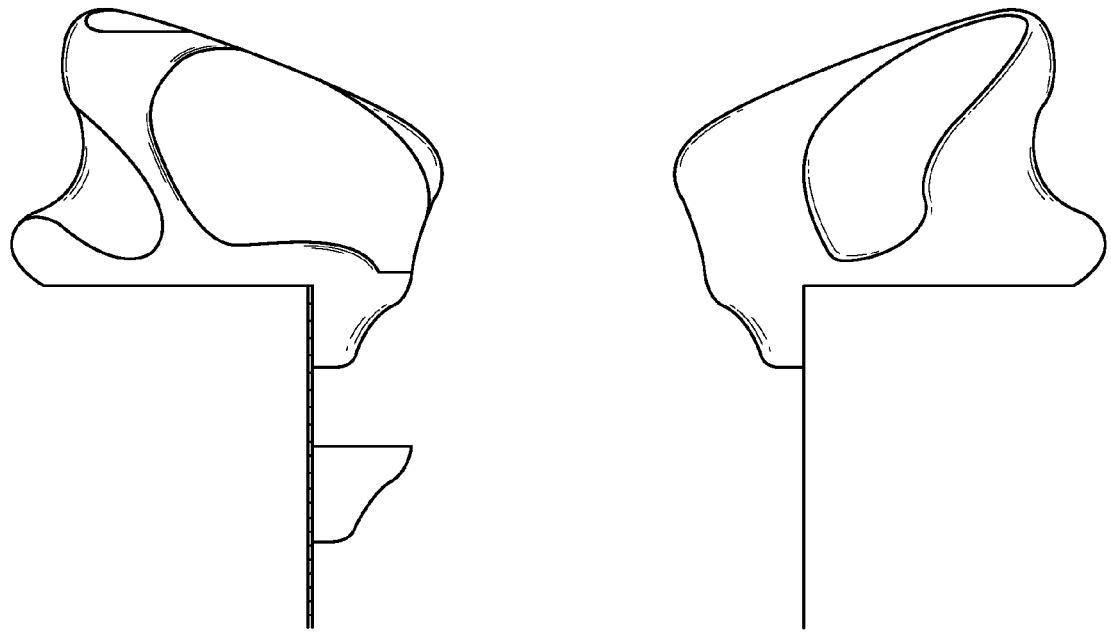
FIG. 6A illustrates an external side view of the upper unit apparatus, wherein the side illustrated in FIG. 6A is the alternate side of said apparatus in FIG. 6.

FIG. 6 illustrates an external side view of the base unit assembly 120 and various externally visible components of said base unit assembly 120. Visible in FIG. 6 is an external housing member 110 comprising impressions and depressions 115, wherein said impressions and depressions are designed to be substantially compatible with the human hand. Protruding outwardly out of said external housing member 110 are a plurality of option selection members 160, a plurality of material dimension selection members 150 and a digital display member 140. Also illustrated in FIG. 6 is the tethering member extending outwardly from said base member 120 from an internal tether spool assembly 140 (see FIG. 7A), a sound throughway cavity 190 and a substantially flat resting surface 170.

Figure 7:
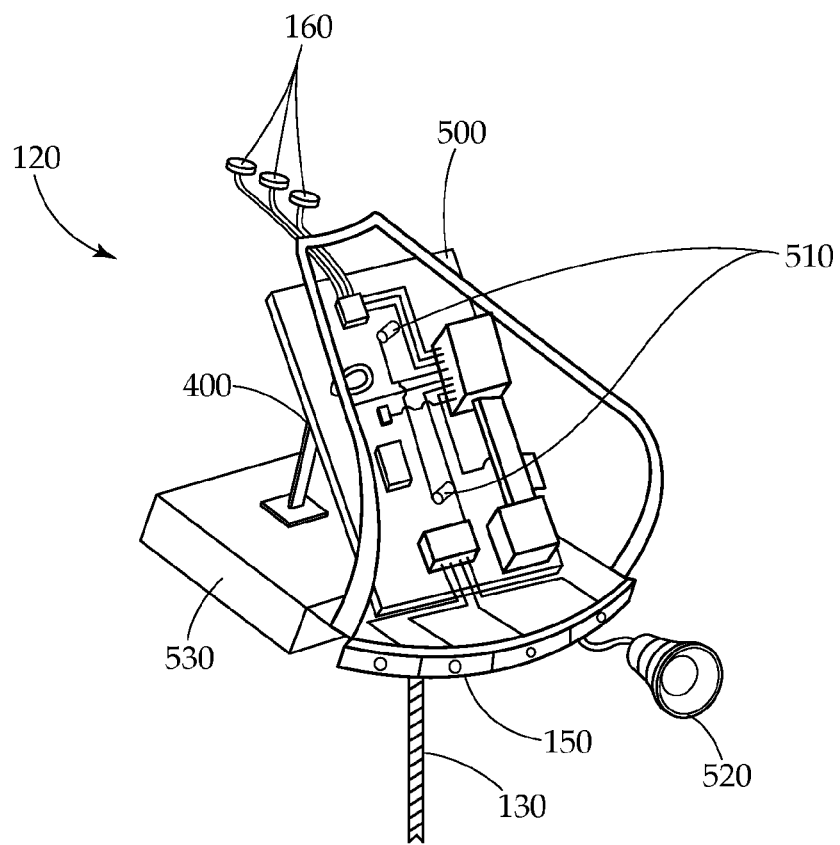
FIG. 7 illustrates an internal top-side isometric view of the upper unit apparatus and various internal components.

FIG. 7 illustrates the internal arrangement of the components disposed inside the base unit assembly 120, comprising: a circuit board 500 and at least one illumination member 510 (such as LEDs) attached to said circuit board 500. Also illustrated in FIG. 7 is a sound producing unit 520 (such as a speaker) which is removeably attached to said circuit board 500, wherein said sound producing unit 520 is used to produce the audio alerts and signals to the users. Further illustrated in FIG. 7 is an orientation assembly 400, herein illustrated as resting substantially below and behind said circuit board 500, wherein said orientation assembly is attached to a power unit 530. Also, FIG. 7 illustrates common elements of the instant invention as they are disposed from an internal perspective. These common elements include a plurality of option selection members 160, material dimension selection members 150 and a tethering member 130. FIG. 7 displays said option selection members 160 and said material dimension selection members are connected to said circuit board 500 by a plurality of wires.

Figure 7A:
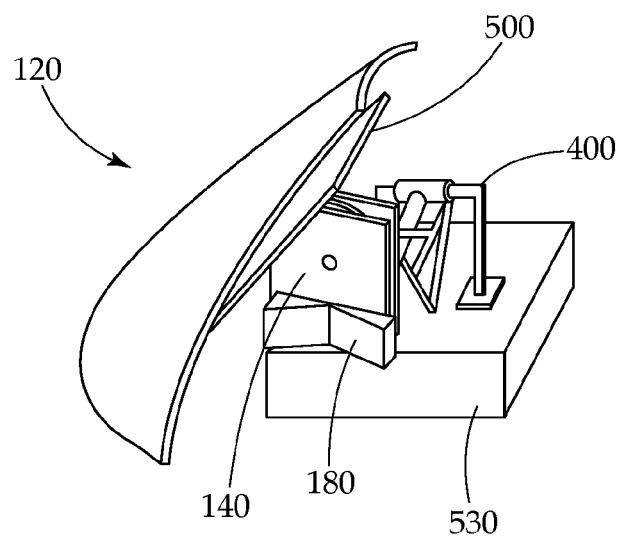
FIG. 7A illustrates a side internal isometric view of the upper unit apparatus, wherein from the angle view from in FIG. 7A additional components not visible in FIG. 7 are visible.

FIG. 7A illustrates an internal side view of the base unit assembly 120 from a substantially different angle as shown in FIG. 7, wherein, from this angle, a view of the disposition of said orientation assembly 400 relative to the remaining internal components of the base unit assembly 120 is clearly shown. As illustrated in FIG. 7A, the orientation assembly 400 rests on the power unit 530 as shown in FIG. 7 and under the circuit board 500 as in FIG. 7A. Also visible in FIG. 7A are the tether spool assembly 140 and a tether locking member 180, wherein the tethering member 130 is wound about said tether spool assembly 140 and then may be held in place by engaging the tether locking member 180 to hold said tether spool assembly 140 in place.

Figure 8:
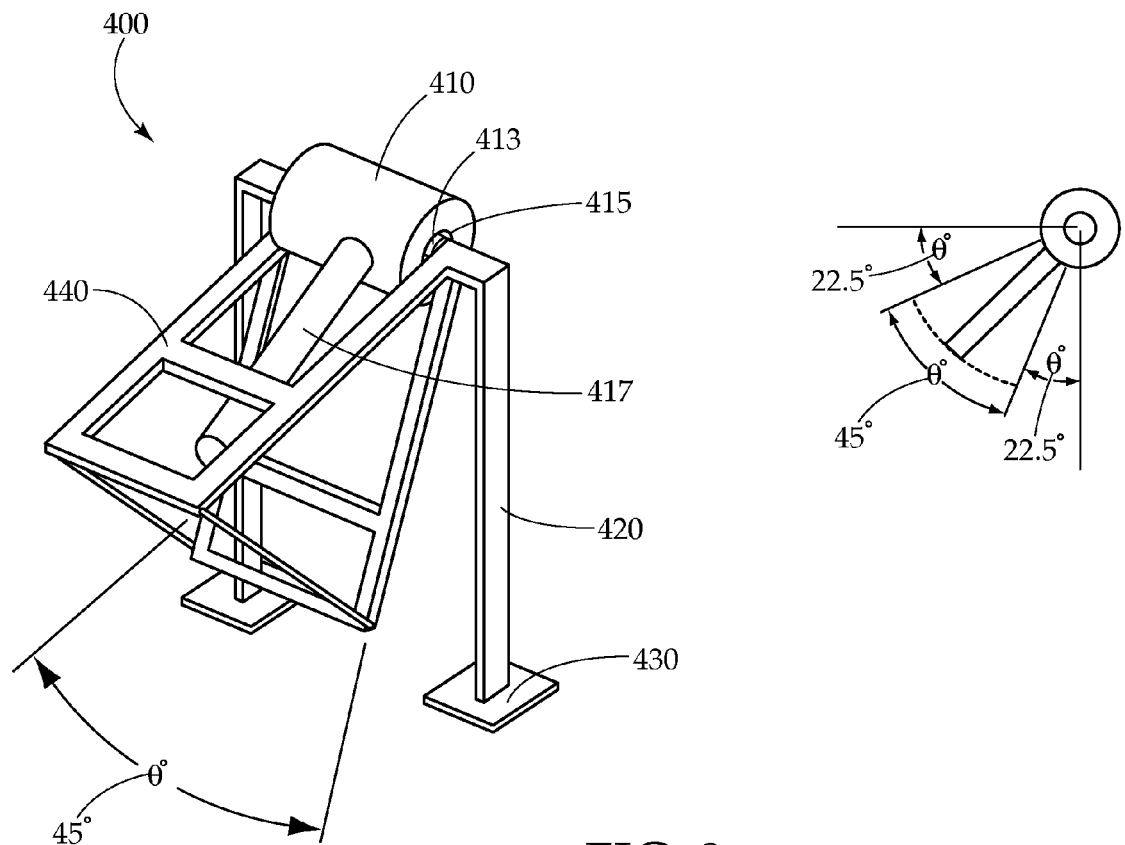
FIG. 8 illustrates an isometric view of the orientation assembly.
Figure 8A:
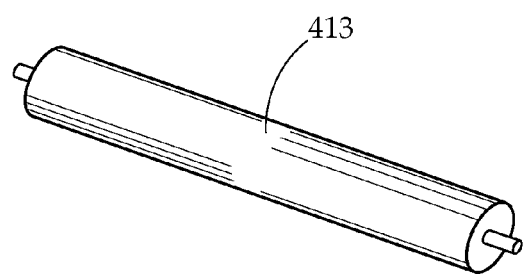
FIG. 8A illustrates a frontal view of the cylindrical rotating member used in orientation assembly.

FIG. 8 illustrates a detailed view of the orientation assembly 400 and its component parts. An orientation assembly frame 420 is attached at its ends to orientation assembly mounting members 430, wherein said orientation assembly mounting members 430 attach said orientation assembly 400 to said power unit 530 (see FIGS. 7 and 7A). Further illustrated in FIG. 8 is a central cylindrical tube member 410, through which a cylindrical rotating member 413 passes through a cylindrical cavity 415 within said central cylindrical tube member 410. The cylindrical rotating member 413 (illustrated in FIG. 8A) attaches at each of its ends to one end of the orientation assembly frame 420. Also attached to the central cylindrical tube member 410 is a swinging arm member 417. Further illustrated in FIG. 8 is the orientation carriage assembly 440 that is attached to the ends of said cylindrical rotating member 413. The functioning of said orientation apparatus is such that when the base unit assembly 120 rests in a substantially horizontal position (such as along a horizontal cutting or measuring surface), the swinging arm member 417 rests in a substantially vertical position relative to the bottom of said base unit assembly 120, wherein this acts like a switch to said circuit board member 500 indicating that cutting or measuring is taking place along one chosen height or width dimension. Conversely, when said base unit assembly 120 rests in a substantially vertical position (such as a cutting or measuring surface vertical to the ground) the swinging arm member 417 is in a substantially vertical position relative to the bottom of said base unit assembly, wherein this informs said circuit board member 500 that cutting and/or measuring is taking place in the height or width dimension that is not used when the base unit assembly 120 is resting in a substantially horizontal position (as mentioned above). Note that in some embodiments of the instant invention the user may select which dimension (height or width) is being measured for what orientation the base unit assembly 120 is in (a horizontal orientation or a vertical orientation).

What is claimed is:

1. A manual measuring and cutting apparatus comprising:
   a base unit assembly;
   a tethering member; and
   a cutting assembly tethered to said base unit assembly by said tethering member; and
   wherein said base unit assembly further comprises a measured distance display means showing a distance of said base unit from said cutting assembly, and an outer housing member forming an exterior of said base unit assembly.

2. The manual measuring and cutting apparatus of claim 1, wherein said tethering member comprises a long thin flexible cord.

3. The manual measuring and cutting apparatus of claim 1, wherein said tethering member is comprised of nylon.

4. The manual measuring and cutting apparatus of claim 1, wherein said cutting assembly comprises an outer housing member forming an exterior of said cutting assembly and at least one cutting member at least partially protruding from the outer housing member, wherein said outer housing member is attached to said tethering member.

5. The manual measuring and cutting apparatus of claim 1, wherein said measuring distance display means is a mechanical counter apparatus.

6. The manual measuring and cutting apparatus of claim 4, wherein said outer housing member comprises an ergonomic shape, wherein said ergonomic shape is designed to be comfortably held by a human hand and wherein said outer housing further comprises a downward protruding section, wherein said downward protruding section substantially hides the profile of said cutting assembly when said measuring and cutting apparatus is viewed from the side.

7. A manually and artificially powered measuring and cutting apparatus comprising:
   a base unit assembly;
   a tethering member windable about a tether spool assembly inside said base unit assembly; and
   a cutting assembly tethered to the base unit assembly by said tethering member.

8. The manually and artificially powered measuring and cutting apparatus of claim 7, wherein said base unit assembly comprises:
   an outer housing member forming an exterior of said base unit assembly;
   an electronic display means visible through said outer housing member;
   an electronic distance measuring means covered by the outer housing member;
   an electronic data processing means covered by the outer housing member;
   a balance detection means covered by the outer housing member;
   a spool assembly covered by the outer housing member, about which said tethering member is wound;
   a tether locking means configured to lock the spool assembly;
   a plurality of mode selection members to adjust a display of the electronic display means;
   a plurality of material dimension selection and input members on a surface of the outer housing member;
   a sound generation means covered by the outer housing member; and
   an electronic sound generation means covered by the outer housing member.

9. The manually and artificially powered measuring and cutting apparatus of claim 8, wherein said tethering member comprises a long thin flexible cord through which electrical current passes.

10. The manually and artificially powered measuring and cutting apparatus of claim 9, wherein said tethering member is further comprised of an internal conductive material, wherein said material is comprised of a member selected from the group consisting of copper, gold, silver, aluminum and iron.

11. The manually and artificially powered measuring and cutting apparatus of claim 10, wherein said cutting assembly comprises:
- an outer housing member, wherein said outer housing member is attached to said tethering member;
- at least one cutting member at least partially protruding from said outer housing member;
- a motor assembly on an interior of the cutting assembly;
- a blade stabilizer assembly on an interior of the cutting assembly; and
- a cutting blade member attached to the at least one cutting member.

12. The manually and artificially powered cutting apparatus of claim 11, wherein said electronic display means comprises a digital imaging display member and a digital image processing and transmitting apparatus, wherein said digital image processing and transmitting apparatus transmits digital images to said digital imaging display member, wherein said digital imaging display member displays said digital images on an outer facing display member of said digital imaging display member and, wherein said outer facing display member substantially securely rests within said outer housing member.

13. The manually and artificially powered measuring and cutting apparatus of claim 12, wherein said electronic distance measuring means comprises:
- a distance counter apparatus, wherein said distance counter apparatus tracks the distance displacement of said tethering member;
- a digital distance recording means, wherein said digital distance recording means records the distance displacement of said tethering member collected by said distance counter apparatus; and
- a plurality of data transfer members, wherein said plurality of data transfer members transfer data from said digital distance recording means to said electronic display means and to said data processing means.

14. The manually and artificially powered measuring and cutting apparatus of claim 13, wherein said electronic data processing means comprises:
- a digital calculator device, wherein said digital calculator device performs a variety of mathematical functions;
- a digital alerting means, wherein said digital alerting means receives digital data from said digital calculator device and said digital recording means and transfers an alert signal to said electronic display means or to said electronic sound generation means.

15. The manually and artificially powered measuring and cutting apparatus of claim 14, wherein said electronic sound generation means comprises at least one circuit board, wherein said circuit board processes data and receives input data through said plurality of mode selection members, said plurality of material dimension selection and input members, and said balance detection means.

16. The manually and artificially powered measuring and cutting apparatus of claim 15, wherein said base unit assembly further comprises one sound generating speaker.

17. The manually and artificially powered measuring and cutting apparatus of claim 16, wherein said outer housing member comprises an ergonomic shape, wherein said ergonomic shape is designed to be comfortably held by a human hand and wherein said outer housing further comprises a downward protruding section, wherein said downward protruding section substantially hides the profile of said cutting assembly when said measuring and cutting apparatus is viewed from the side and wherein said balance detection means comprises an internal pendulum assembly, wherein at times when said pendulum assembly detects to what degree said manually and artificially powered measuring and cutting apparatus is off a level plane as compared with a horizontal plane to a common center of gravity.

18. A method of measuring and cutting materials comprising the steps of:
- placing a base unit assembly onto one end of a material to be cut;
- pulling a cutting assembly away from said base unit assembly until a desired length of material to be cut is reached, said cutting assembly being tethered to said base unit assembly by a tethering member, wherein said cutting assembly comprises a cutting blade member and, wherein said length of material to be cut is substantially equivalent to a distance of displacement from said one end of said material to be cut to the resting point of said cutting blade member against said material after the step of pulling said cutting assembly away from said base unit assembly until a desired length of material to be cut is reached;
- manually applying force to substantially simultaneously push said base unit assembly and said cutting assembly in the same direction, wherein said base unit assembly is substantially pushed along a first path that along said one end of said material, wherein said first path corresponds to the contours of said one end of said material and, wherein said cutting assembly is substantially pushed along a second path that substantially replicates said first path, wherein the set of all points of said first path have a corresponding point in the set of all points of said second path, wherein the distance between any point in the set of all point of said first path and its corresponding point in the set of all points of said second path is substantially the same distance as said distance of displacement from said one end of said material to be cut to the resting point of said cutting blade member against said material subsequent to the step of pulling said cutting assembly away from said base unit assembly until a desired length of material to be cut is reached;
- applying sufficient pressure to the cutting assembly to force the cutting blade member to penetrate though a front side and a rear side of said material to be cut, wherein a subpiece of said material to be cut is substantially severed from said material to be cut.

19. The method of measuring and cutting materials of claim 18, wherein said base unit further comprises:
- an ergonomically shaped outer housing member;
- an electronic display means visible on a surface of said outer housing member;
- an electronic distance measuring means within said outer housing member;
- an electronic data processing means within said outer housing member;
- a balance detection means within said outer housing member;
- a spool assembly within said outer housing member, about which said tethering member is wound;
- a tether locking means configured to lock the spool assembly;
- a plurality of mode selection members to adjust a display of the electronic display means;
- a plurality of material dimension selection and input members on a surface of the outer housing member;
- a sound generation means within said outer housing member; and
- an electronic sound generation means within said outer housing member, and, wherein said method further comprises the steps of:
- entering in a set of dimensions of said material to be cut by utilizing said plurality of material dimension selection and input members;
- entering in at least one mode utilizing said plurality of mode selection member;
- ending said step of pulling a cutting assembly away from said base unit assembly until a desired length of material to be cut is reached when an visual-audio alert is detected, wherein visual components of said visual-audio alert are displayed through said electronic display means, and audio components of said visual-audio alert are made via said sound generation means; and
- activating said cutting assembly, wherein said cutting blade member performs a cutting motion after cutting, wherein said step of activating said cutting assembly is made prior to said step of manually applying force to substantially simultaneously push said base unit assembly and said cutting assembly in the same direction.

* * * * *